United States Patent Office 3,097,086
Patented July 9, 1963

---

3,097,086
PROPIOLATES
John E. Katon and Lee A. Miller, Dayton, Ohio, assignors to Monsanto Chemical Company, St. Louis, Mo., a corporation of Delaware
No Drawing. Filed Dec. 30, 1960, Ser. No. 79,504
10 Claims. (Cl. 71—2.3)

The present invention relates to ether-substituted carboxylates and more particularly provides certain halogenated, ether-substituted esters of propiolic acid, the method of preparing the same, and herbicidal compositions comprising the new esters.

An object of this invention is the provision of new and valuable esters of propiolic acid and a haloaryloxyalkanol. Another object of the invention is the provision, from propiolic acid, of ether-esters having herbicidal utility. The preemergent control of plant life wherein there are employed compositions comprising the presently provided ether-esters is a further objective of the invention. A very important objective of the invention is the provision of (haloaryloxy)alkyl propiolates of utility as intermediates in the organic chemicals industry and as plasticizers and polymerizable and copolymerizable monomers in the synthetic resins and plastics industries.

These and other objects hereinafter defined are provided by the invention wherein there are prepared (haloaryloxy)alkyl propiolates by the reaction of propiolic acid or an acyl halide thereof and a (haloaryloxy)alkanol substantially according to the scheme:

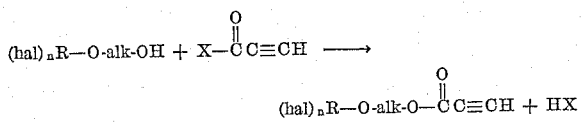

wherein X is selected from the class consisting of halogen and —OH, hal is selected from the class consisting of chlorine and bromine, $n$ is an integer of from 1 to 5, R is an aromatic hydrocarbon radical of from 6 to 12 carbon atoms, and alk is an alkylene radical of from 2 to 4 carbon atoms.

The (haloaryloxy)alkanols which are useful for the preparation of the presently provided propiolates are phenoxyalkanols or naphthyloxyalkanols wherein the phenoxy or the naphthyloxy radicals are substituted by from 1 to 5 chlorine or bromine atoms and may or may not be also substituted by one or more alkyl radicals or by the phenyl radical (in the case of the phenoxy compounds), and the alkanol portion of the molecule has from 2 to 4 carbon atoms. Conveniently such haloaryloxyalkanols have been prepared in prior art by reaction of a halogenated phenol or naphthol with an alkylene oxide, e.g., ethylene oxide or propylene oxide or with a glycol such as ethylene or butylene glycol. Examples of the presently useful haloaryloxyalkanols are 2-(2-, 3- or 4-chlorophenoxy)ethanol; 2-(2-, 3- or 4-bromophenoxy)ethanol; 3-(2-, 3- or 4-chlorophenoxy)-propanol; 2-(2-, 3- or 4-chlorophenoxy)-1-methylethanol; 2-(2,3- or 2,4- or 2,5- or 2,6- or 3,4- or 3,5-dichloro- or dibromophenoxy)ethanol; 2-(2,3,5- or 2,4,5- or 2,4,6-trichloro- or tribromophenoxy)ethanol; 4-(2-, 3- or 4-chlorophenoxy butanol; 3-(2,- 3- or 4-bromophenoxy)-2-methylpropanol; 2-(β-chloro-α-naphthyloxy)ethanol; 3-(α-bromo-β-naphthyloxy)propanol; 2-(2-bromo-3-chloro-4-methylphenoxy)ethanol; 2-(2-chloro-4-phenylphenoxy)-ethanol; 2-(2,3,4,5-tetrachlorophenoxy)-2-ethylethanol; 3-(2,3,5,6-tetrabromophenoxy)-1-methylpropanol; 2-(pentachloro- or pentabromophenoxy)ethanol; etc.

Corresponding (haloaryloxy)alkyl propiolates are thus obtained, e.g., 2-(2,4,5-trichlorophenoxy)-ethanol and propiolyl chloride or bromide give 2-(2,4,5-trichlorophenoxy)ethyl propiolate; 3-(β-bromo-α-naphthyloxy)-propanol and propiolic acid give 3-(β-bromo-α-naphthyloxy)propyl propiolate; and 4-(2-chloro-3,4-dibromophenoxy)butanol and propiolic acid give 4-(2-chloro-3,4-dibromophenoxy)butyl propiolate; i.e., the (haloaryloxy)-alkyl radical of the propiolate which is obtained corresponds to the (haloaryloxy)alkanol which is employed.

As the propiolic acid compound which is used for reaction with the (haloaryloxy)alkanols may be mentioned propiolic acid, propiolyl chloride or propiolyl bromide.

Reaction of the (haloaryloxy)alkanols with the propiolic acid compound is effected at ordinary or decreased or increased temperature and in the presence or absence of an inert diluent or solvent and/or an acidic esterification catalyst. Preferably, the reaction is conducted by heating a mixture of the two reactants at a temperature of, say, from 60° C. to 150° C. in the presence of a catalytic quantity of an acidic compound which may be a mineral acid such as sulfuric acid or phosphoric acid or an organic acid such as p-toluenesulfonic acid, etc. When a solvent or diluent is used, it is advantageous to employ one which forms an azeotropic mixture with water in order to thereby assure easy removal of reaction water from the reaction mixture. Examples of presently useful solvents are benzene, toluene, xylene, hexane, hexachloroethane, etc. Since esterification of the propiolic acid compound with the (haloaryloxy)alkanol requires one mole of the acid compound per mole of the alkanol, these two reactants are advantageously used in stoichiometric proportions; however, since an excess of the acid compound can be readily recovered from the reaction product, such excess may be employed.

The presently provided (haloaryloxy)alkyl propiolates are stable, well-characterized compounds which range from viscous liquids to crystalline or waxy solids. They are advantageously employed for a variety of agricultural and industrial purposes, for example, as plasticizing monomers in copolymerization reactions, e.g., with vinyl compounds, as intermediates for the preparation of the corresponding chloropropionates by halogenation or hydrohalogenation, and as biological toxicants, e.g., as herbicides, bacteriostats, fungistats and insecticides. They are particularly valuable as preemergent herbicides.

This invention is illustrated by but not limited to the following examples:

Example 1

A mixture consisting of 20.7 g. (0.1 mole) of 2-(2,4-dichlorophenoxy)ethanol, 7.7 g. (0.11 mole) of propiolic acid, 2 drops of sulfuric acid and 100 ml. of benzene was stirred at reflux under a Dean-Stark apparatus for 4 hours. At the end of this time 1.8 ml. (100% theoretical) of water had collected in the water-trap. Accordingly, heating was discontinued and the reaction mixture was allowed to stand overnight. After diluting it with 100 ml. of ether, the reaction mixture was washed with water, aqueous sodium bicarbonate and water. Evaporation gave an orange oil which upon distillation gave the substantially pure 2-(2,4-dichlorophenoxy)ethyl propiolate, B.P. 146–8° C./0.6 mm., $n_D^{25}$ 1.5475 analyzing 50.08% carbon and 3.39% hydrogen as against 50.99% and 3.11%, the respective calculated values.

Example 2

This example shows evaluation of the 2-(2,4-dichlorophenoxy)ethyl propiolate of Example 1 as a selective preemergent herbicide. Briefly, the chemical is applied in spray form to soil seeded to representative grasses and broad-leaf plants.

Aluminum pans were level filled with a good grade of top soil which had been screened through a ¼″ wire mesh.

The soil surface was then compacted to a depth of ⅜″ from the top of the pan. A predetermined number of seeds each of morning glory, wild oat, brome grass, foxtail, crab grass, rye grass, radish, sugar beet, soybean, wild buckwheat, tomato, sorghum and pigweed were then scattered on the soil surface and covered with soil to the pan top.

The planted pans, except for controls, were sprayed with an aliquot of an organic solvent containing the chemical to be tested. The tests were made at the rate of 5 lbs. per acre. After spraying, the pans were placed on sand in a bench in the greenhouse and the bench flooded with water to ½″ above the sand level. The test pans of soil were allowed to absorb moisture through the perforated bottom until the surface was about ½ moist. The excess water was then drained off below the bench sand level. The surface of the test pans rapidly became completely moist by capillary action and was maintained adequately wet by sub-irrigation for the two week test period.

Observation of the pans at the end of that time showed that those which had been sprayed with the 5 lb. per acre solution of the β-(2,4-dichlorophenoxy)ethyl propiolate showed no emergence of seedlings, whereas the seeds which had been planted in the pan that had not been sprayed with the present test compound had emerged and the plants were in excellent condition.

In subsequent tests, the concentration of the test compound was progressively decreased to as little as ⅛ of a pound per acre. At this concentration the morning glory, radish, sugar beets, crab grass, pigweed and soybean failed to emerge, tomato was moderately injured, and the following were not at all affected: wild oat, brome grass, rye grass, foxtail and sorghum. The 2-(2,4-dichlorophenoxy)-ethyl propiolate thus inhibited all of the test plants at the higher concentration and selectively attacked the broad-leafed plants at the low concentration; moreover, at the low concentration it inhibited germination of crab grass while not affecting the other grasses.

The present (haloaryloxy)alkyl propiolates are characterized by a high degree of efficacy in that they possess selective preemergent herbicidal efficacy at very low concentrations. Herbicidal compositions containing the present compounds are advantageously formulated by first preparing a solution thereof in an organic solvent and then adding the resulting solution to water containing an emulsifying agent to form an oil-in-water emulsion. Emulsifying agents which may be employed are those customarily used in the art for the preparation of oil-in-water emulsions. Examples of emulsifying agents which may be used include the long chained alkylbenzenesulfonates, long chained polyalkylene glycols, the long chained alkylsulfosuccinates, etc.

While the present compounds are most advantageously employed as herbicides and as other biological toxicants by incorporating them into an emulsion as herein described, they may also be incorporated into solid carriers such as clay, talc, pumice or bentonite to give compositions which may be applied either to infested areas or to locale which may be subjected to infestation. They may also be dissolved in liquefied gases such as the fluorochloroethanes or methyl chloride and applied from aerosol bombs containing the solution.

What we claim is:

1. A compound of the formula

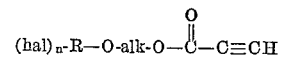

in which hal is selected from the class consisting of chlorine and bromine and is attached to aromatic nuclear carbon, $n$ is an integer of from 1 to 5, R is an aromatic hydrocarbon radical of from 6 to 12 carbon atoms and is selected from the class consisting of the phenyl and naphthyl radicals and such radicals carrying alkyl-substitution, and alk is an alkylene radical of from 2 to 4 carbon atoms.

2. The compound defined in claim 1, further limited in that hal is chlorine.

3. A compound of the formula

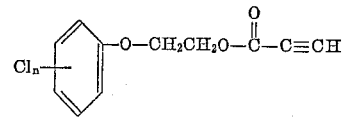

in which $n$ is a number of from 1 to 5.

4. 2-(2,4-dichlorophenoxy)ethyl propiolate.

5. A preemergent herbicidal composition comprising an oil-in-water emulsion containing, as the essential effective ingredient, a herbicidal quantity of the compound defined in calim 1.

6. A preemergent herbicidal composition comprising an oil-in-water emulsion containing, as the essential effective ingredient, a herbicidal quantity of the compound defined in claim 3.

7. A preemergent herbicidal composition comprising an oil-in-water emulsion containing a herbicidal quantity of 2-(2,4-dichlorophenoxy)ethyl propiolate as the essential effective ingredient.

8. The method of inhibiting plant growth which comprises applying to soils normally supporting said growth, a herbicidal quantity of a preemergent herbicidal composition comprising the compound of claim 1 as the essential effective ingredient.

9. The method of inhibiting plant growth which comprises applying to soils normally supporting said growth, a herbicidal quantity of a preemergent herbicidal composition comprising the compound of claim 3 as the essential effective ingredient.

10. The method of inhibiting plant growth which comprises applying to soils normally supporting said growth, a herbicidal quantity of a preemergent composition comprising 2-(2,4-dichlorophenoxy)ethyl propiolate as the essential effective ingredient.

References Cited in the file of this patent

UNITED STATES PATENTS

| | | |
|---|---|---|
| 2,338,683 | Coleman et al. | Jan. 4, 1944 |
| 2,362,189 | Coleman et al. | Nov. 7, 1944 |
| 2,401,261 | MacMullen | May 28, 1946 |
| 2,693,407 | Swezey | Nov. 2, 1954 |
| 2,765,224 | Lambrech | Oct. 2, 1956 |
| 2,777,762 | Toornman | Jan. 15, 1957 |
| 2,823,224 | Senkbeil et al. | Feb. 11, 1958 |